United States Patent
Peacock et al.

(10) Patent No.: US 10,089,711 B2
(45) Date of Patent: Oct. 2, 2018

(54) RECONSTRUCTABLE DIGITAL IMAGE CACHE

(75) Inventors: Gavin Murray Peacock, Walnut Creek, CA (US); Werner Leland Sharp, Allentown, PA (US); Angus Ward Davis, Pleasant Hill, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 869 days.

(21) Appl. No.: 12/875,918

(22) Filed: Sep. 3, 2010

(65) Prior Publication Data

US 2013/0162664 A1    Jun. 27, 2013

(51) Int. Cl.

| | |
|---|---|
| G06F 12/02 | (2006.01) |
| G06T 1/60 | (2006.01) |
| G09G 5/14 | (2006.01) |
| G09G 5/393 | (2006.01) |
| G09G 5/36 | (2006.01) |
| G06F 3/14 | (2006.01) |
| G09G 5/39 | (2006.01) |

(52) U.S. Cl.
CPC ............. *G06T 1/60* (2013.01); *G09G 5/14* (2013.01); *G09G 5/393* (2013.01); *G06F 3/14* (2013.01); *G06F 12/023* (2013.01); *G09G 5/363* (2013.01); *G09G 5/39* (2013.01); *G09G 2360/121* (2013.01)

(58) Field of Classification Search
CPC .......... G06T 1/60; G06F 12/023; G06F 3/14; G09G 5/363; G09G 5/39
USPC ....................................................... 345/543
See application file for complete search history.

(56) References Cited

U.S. PATENT DOCUMENTS

| | | | |
|---|---|---|---|
| 5,615,362 A * | 3/1997 | Jensen et al. | |
| 5,829,022 A * | 10/1998 | Watanabe et al. | 711/118 |
| 5,872,969 A * | 2/1999 | Copeland et al. | 718/101 |
| 5,887,275 A * | 3/1999 | Nguyen et al. | 711/206 |
| 5,999,189 A * | 12/1999 | Kajiya et al. | 382/232 |
| 6,446,188 B1 * | 9/2002 | Henderson et al. | 711/206 |

(Continued)

OTHER PUBLICATIONS

Podlipnig et al., "A Survey of Web Cache Replacement Strategies", Dec. 2003, ACM Computing Surveys, 35(4):374-398, 24 pages.

(Continued)

*Primary Examiner* — Abderrahim Merouan
(74) *Attorney, Agent, or Firm* — Wolfe-SBMC

(57) ABSTRACT

Methods, systems, and apparatus, including computer programs encoded on computer storage media, for caching during media content rendering. In one aspect, a method performed by data processing apparatus includes receiving a request to load a digital image object for rendering; generating a first object from the digital image object; and managing the first object in a cache memory using a management object that is added to and removed from the cache memory along with the first object. In another aspect, a system includes a display device; a computer storage medium containing a cache memory; and a processor programmed to manage caching of data objects to be rendered using management objects that are cached along with the data objects, where at least one of the management objects includes a reference to a corresponding data object and an interface through which release and restoration of the corresponding data object is effected.

20 Claims, 5 Drawing Sheets

(56) References Cited

U.S. PATENT DOCUMENTS

| | | | | |
|---|---|---|---|---|
| 6,594,742 | B1* | 7/2003 | Ezra | 711/159 |
| 6,611,898 | B1* | 8/2003 | Slattery | G06F 12/0253 707/999.001 |
| 6,654,766 | B1* | 11/2003 | Degenaro | G06F 12/123 |
| 6,785,771 | B2* | 8/2004 | Ash et al. | 711/136 |
| 6,823,427 | B1* | 11/2004 | Sander et al. | 711/136 |
| 6,826,599 | B1* | 11/2004 | Shaffer et al. | 709/213 |
| 7,050,063 | B1* | 5/2006 | Mantor et al. | 345/582 |
| 7,337,273 | B2* | 2/2008 | Schmidt et al. | 711/129 |
| 7,444,329 | B2* | 10/2008 | Harris et al. | |
| 7,480,767 | B2* | 1/2009 | Moser | 711/133 |
| 7,589,738 | B2* | 9/2009 | Candler | 345/557 |
| 7,774,546 | B1* | 8/2010 | Wright et al. | 711/118 |
| 8,271,736 | B2* | 9/2012 | Gupta | G06F 12/121 711/133 |
| 2003/0105837 | A1* | 6/2003 | Kamen et al. | 709/220 |
| 2004/0003348 | A1* | 1/2004 | Ostertag et al. | 715/514 |
| 2004/0172495 | A1* | 9/2004 | Gut et al. | 711/1 |
| 2004/0205297 | A1* | 10/2004 | Bearden | 711/133 |
| 2005/0165758 | A1* | 7/2005 | Kasten | G06F 9/5016 |
| 2005/0283573 | A1* | 12/2005 | Mewhinney et al. | 711/136 |
| 2006/0111943 | A1* | 5/2006 | Wu | 705/3 |
| 2006/0248284 | A1* | 11/2006 | Petev | 711/141 |
| 2006/0248285 | A1* | 11/2006 | Petev | 711/141 |
| 2006/0290704 | A1* | 12/2006 | White et al. | 345/522 |
| 2007/0067575 | A1* | 3/2007 | Morris | G06F 12/121 711/133 |
| 2007/0113014 | A1* | 5/2007 | Manolov et al. | 711/133 |
| 2008/0209120 | A1* | 8/2008 | Almog et al. | 711/106 |
| 2009/0100224 | A1* | 4/2009 | Wang | 711/118 |
| 2010/0023690 | A1* | 1/2010 | Dewar et al. | 711/118 |
| 2011/0231781 | A1* | 9/2011 | Betzler et al. | 715/757 |

OTHER PUBLICATIONS

Blow, Jonathan, "Implementing a Texture Caching System," Apr. 1998, retrieved from the Internet at htip://www.gdmag.com, 8 pages.

* cited by examiner

RECONSTRUCTABLE DIGITAL IMAGE CACHE

BACKGROUND

This specification relates to operations performed in conjunction with media content rendering.

The Internet is widely used to distribute media content, including video, graphic, audio, and scripting data. Media content can be downloaded as a file, or streamed to a client computer, where a media player application can process and output the media content to a display device and, if applicable, one or more speakers. The media player application or an application including media player functionality, in some examples, can be a program written for a particular operating system (OS) on a computer platform or a "plug-in" based software that runs inside another program, such as a runtime environment, on a computer platform.

Part of media content rendering can include caching images to increase the speed of rendering that image to the screen upon repeated requests for the particular image. In video game systems, background textures, or gradient-sized mipmaps, are cached to increase the speed of background image rendering. Caching uncompressed images, such as bitmaps, can be instrumental in increasing rendering speed, as graphics managers typically require uncompressed image data. Some graphics hardware has been designed specifically to quickly manipulate compressed images, for example to increase the speed of graphics rendering in video gaming systems.

Cache management policies can include least recently used (LRU), least frequently used (LFU), largest items first, or a combination of tactics, generally aimed at keeping memory use under control while gaining the most benefit from maintaining a cache. Some more complex methods for cache management include weighting cached objects, for example by a replacement "cost" corresponding to lost time in obtaining or generating the removed object.

ADOBE® FLASH LITE® software, a lightweight version of ADOBE® FLASH® Player software, by Adobe Systems Incorporated of San Jose, Calif. makes use of a fixed size bitmap LRU cache. The LRU cache includes bitmaps generated by uncompressing compressed images, for example as received in a scripting file such as a SWF file (SWF is a file format, such as the SWF File Format Specification, Version 10, as published by Adobe Systems Incorporated of San Jose, Calif., which delivers vector graphics, text, video, and sound over the Internet). Contents of the bitmap cache are dropped as needed, on an LRU basis, to make room for new bitmap data.

SUMMARY

This specification describes technologies relating to operations performed in conjunction with media content rendering. In one aspect of the subject matter described in this specification, a class of images can be stored in a cached format for more efficient access/rendering, and the cached representation can be flushed and regenerated, as described. A class hierarchy is presented, which can be used to define this aspect. In another aspect of the subject matter described in this specification, the regeneratable images can be managed by another type of object, and the flushing of the cached representations can be based on defined policies, including policies based on access recency. A cache of objects can be provided that manage other objects through an abstraction layer, where those other objects can be bitmaps, but the cache can be agnostic regarding what the objects are. These management objects can be attached to managed objects in such a way that they add themselves to the cache when the objects are created, remove themselves from the cache when the objects are deleted, and can release or restore the associated memory on request. Additional methods provide the size of the memory used, a name for the type of memory, and a releaseable status for the memory.

In general, one innovative aspect of the subject matter described in this specification can be embodied in methods that include receiving a request to load a digital image object for rendering to a display device; generating a first object from the digital image object; and managing the first object in a cache memory using a management object that is added to and removed from the cache memory along with the first object. The managing can include managing using a bitmap class data structure built upon a class structure hierarchy, and the method can include: creating a new bitmap type eligible for regeneration, where the creating includes adding a new bitmap class data structure to the class structure hierarchy.

The first object can be a first bitmap object of a first bitmap category, and the managing can include: storing the first bitmap object in a memory allocation of the cache memory, the cache memory including bitmap objects of two or more bitmap categories, where at least one of the bitmap categories, including the first bitmap category, is eligible for regeneration, and at least one of the bitmap categories, including a second bitmap category, is ineligible for regeneration; tracking access recency of bitmap objects in the cache memory associated with the at least one of the bitmap categories eligible for regeneration; receiving a flush event for the cache memory; and releasing one or more of the bitmap objects from the cache memory based on the access recency of the bitmap objects and the bitmap category being one eligible for regeneration. The digital image object can be a compressed digital image object, the first bitmap category can be a platform independent bitmap type, and the generating can include decompressing the digital image object. Further, the method can include: receiving a request to access one of the released one or more bitmap objects; and reconstructing the requested bitmap object, where the reconstructing includes generating a second bitmap object of the first bitmap category from the digital image object.

The method can also include: receiving a second request to load the digital image object for rendering to the display device; creating a reference to the first bitmap object in response to the second request, where the first bitmap object is one of a first bitmap type, and where a bitmap state of the first bitmap object is set to one of eligible for regeneration; receiving an edit operation for the first bitmap object, the edit operation associated with the second request; generating a second bitmap object of a second category from the first bitmap object, where the second bitmap object is one of the first bitmap type, and where a bitmap state of the second bitmap object is set to one of ineligible for regeneration; and removing the reference to the first bitmap object.

The flush event can include a flush event type; where receiving the flush event includes receiving a periodic flush event type corresponding to a time period; and where releasing responsive to the periodic flush event type includes determining whether the first bitmap object has been accessed within a first time interval by referencing the access recency of the first bitmap object, and releasing based upon the determining. Receiving the flush event can further include receiving a release bytes flush event type corresponding to a failure to load an object into the memory cache, the flush event further including a size request; where releasing responsive to the release bytes flush event type includes releasing one or more least recently accessed bitmap objects eligible for regeneration, based upon the access recency, to free a total cache memory allocation corresponding to the size request; where receiving the flush event further includes receiving a release all flush event type corresponding to a memory capacity threshold; and where releasing responsive to the release all flush event type includes releasing all of the bitmap objects eligible for regeneration.

Another innovative aspect of the subject matter described in this specification can be embodied in systems that include a display device; a computer storage medium containing a cache memory; and one or more processors operable to interact with the computer storage medium and programmed to manage caching of data objects to be rendered to the display device using management objects that are cached along with the data objects in the cache memory, where at least one of the management objects includes a reference to a corresponding data object and an interface through which release and restoration of the corresponding data object is effected.

The data objects can include bitmap objects, the one or more processors can be programmed to track access recency of one or more bitmap objects that are eligible for regeneration, being distinct from one or more bitmap objects that are ineligible for regeneration, and to release one or more of the one or more bitmap objects that are eligible for regeneration based on the access recency. The released one or more of the one or more bitmap objects that are eligible for regeneration can include a decompressed version of a digital image, and the restoration of the corresponding data object can include decompressing the digital image. The one or more processors can be programmed to release data objects periodically based on the access recency compared to a first time interval.

The one or more processors can be programmed to cache a second management object that includes a reference to the corresponding data object of the at least one of the management objects, and to generate a new data object from the corresponding data object and update the second management object to reference the new data object responsive to a request to edit object data corresponding to the second management object. Moreover, the management objects can be derived from a class data structure built upon a class structure hierarchy.

Particular embodiments of the subject matter described in this specification can be implemented to realize one or more of the following advantages. The memory utilization during media player digital image generation can be managed to allow the media player to run on platforms with limited memory resources, such as portable computing devices. Digital images can be generated and cached on a need basis, while source images are tracked to allow for regeneration of images flushed from the image cache. Using an object-oriented design method, further types of bitmaps or other digital images can be added to the existing digital image cache management, building upon existing algorithms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
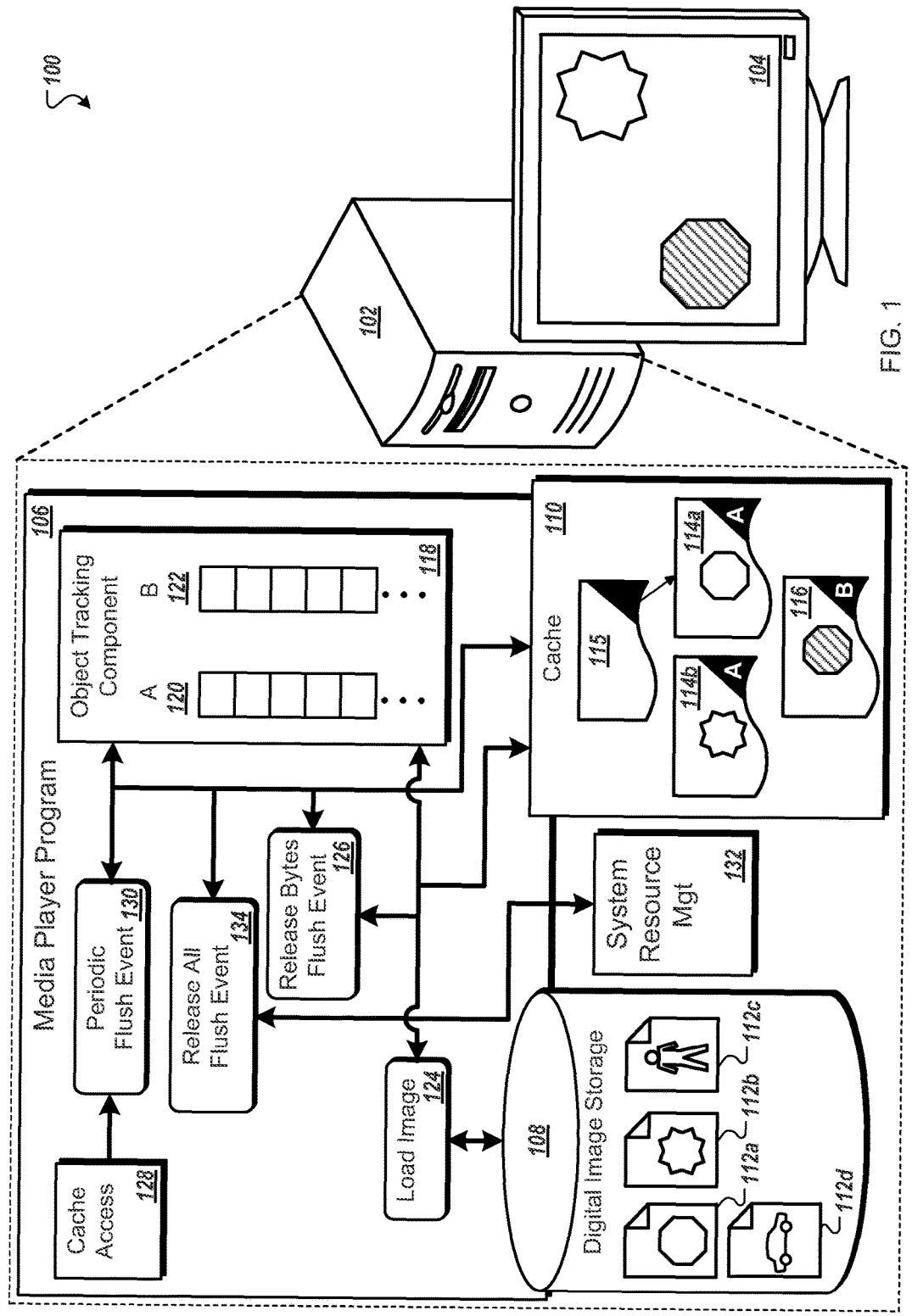
FIG. 1 is a diagram of an example of a system for media player digital image caching.

FIG. 1 is a diagram of an example of a system 100 for media player digital image caching, including a computing device 102 installed with a media player program 106. The media player program 106 can render media content, such as digital images, to a display 104. While rendering video content, the media player program 106 can prepare digital images, such as compressed digital image content, video content snapshots, text content, or mipmap images, to be rendered to the screen. For example, the media player program 106 can prepare a digital image 112a for rendering to the screen by generating a bitmap object 114a of the digital image 112a and storing the bitmap object 114a in a cache 110 area of memory. One or more digital images 112a, 112b, 112c, 112d, for example, can be accessed from a digital image storage area 108.

In general, an object (e.g., objects 114a-b) can be generated and cached as needed, and the object can be managed in the cache 110, which need not be specific to bitmaps, using a management object 115. The management object 115 can attach to a managed object in such a way that it adds itself to the cache 110 when the managed object is created, removes itself from the cache 110 when the managed object is deleted, and can release or restore the associated memory used for the managed object on request. For example, the cache 110 can hold a cache of objects that manage other objects through an abstraction layer. These management objects (e.g., bitmapCacheItems) can be effected using a base class that implements the abstract cache item that gets pulled into the cache 110, and then there can be different implementations for each different type of bitmap object in terms of what it takes to release and restore that type of bitmap object. Additional methods can provide the size of the memory used, a name for the type of memory, and a releaseable status for the memory.

This cache management structure enables savings on memory space used while a program that creates the bitmap objects can remain ignorant of the caching logic. The management object 115 can include a reference to the bitmap object or the source digital image or both, an indication of access recency (e.g., a timestamp of last access), and an indication of whether or not the bitmap object being managed has been modified (e.g., a dirty bit). When the bitmap object is created by a calling program, an appropriate management object 115 can be created and cached, but the bitmap object itself need not be generated at that time, and the management object 115 can expose an interface through which the bitmap object is managed with respect to loading, unloading, and reconstruction, as needed.

For example, if the bitmap object is a decompressed version of a compressed digital image, when the digital image is first loaded, the appropriate management object 115 can be created and placed in the cache 110, but the digital image need not be decompressed and the resulting bitmap object need not be placed in the cache 110 (thus saving on memory usage) until an attempt to actually access the bits of the bitmap object is detected, at which point the decompression and bitmap caching can be done. As another example, if the bitmap object is a copy of a previously loaded bitmap object, when this bitmap object is first loaded, the appropriate management object 115 can be created and placed in the cache 110, but the source bitmap object need not be copied to the target bitmap object (thus saving on memory usage) until an attempt to edit the target bitmap object is detected, at which point the source bitmap object can be copied and modified, and its management object 115 can be updated to show that the managed object can no longer be released (in the case where the modification to this bitmap object cannot later be reconstructed).

Moreover, although described as an area of memory, the cache 110 does not necessarily have a set size. For example, the cache 110 can grow until meeting a system limitation, such as a low memory threshold event. To limit the amount of information stored to the cache 110, and therefore avoid meeting a system limitation, the media player program 106 can track the access recency of bitmap objects stored in the cache 110 which have been generated from other images (e.g., the images 112a-d stored in the digital image storage area 108). In other words, the access recency of bitmap objects that are categorized as being eligible for regeneration can be tracked. Periodically, or on a need basis, the media player program 106 can flush the cache 110 of the least recently used bitmap objects eligible for regeneration.

The media player program 106 includes an object tracking component 118 that can track a variety of types of digital images stored in the cache 110. The object tracking component 118 can be implemented using the management object structure described above. The object tracking component 118 can track the storage location and access recency of each 20 of a first category 120 of digital image objects (e.g., bitmap objects eligible for regeneration) as well as the storage location of each of a second category 122 of digital image objects (e.g., bitmap objects ineligible for regeneration). The object tracking component 118 can be used to flush one or more bitmap objects 114a-b eligible for regeneration from the cache 110 based upon a variety of flush events.

In some implementations, the object tracking component 118 can include an index linking each of the first category 120 of digital image objects to an original digital image (e.g., the digital images 112a-d in the digital image storage area 108). For example, during a load image operation 124, the media player program 106 can first attempt to locate the requested digital image 112a-d in the cache 110 by searching for the referenced digital image 112a-d through the bitmap object tracking component 118. If the requested digital image 112a-d is not found, the digital image 112a-d can be loaded by the media player program 106 from the digital image storage area 108. Depending upon the type of digital image and the use of the image by the media player program 106, the media player program 106 can perform operations upon the digital image 112a-d to generate the bitmap object 114a-b or 116.

In some implementations, the original digital image (e.g., the digital images 112a-d) can each have a wrapper (e.g., a management object 115) which, when a bitmap object 114a-b is generated, is updated to reference the location of the bitmap object 114a-b in the cache 110. For example, without having to modify application code, a reference to the digital image can automatically forward to an existing bitmap object. Thus, the objects in the cache 110 can include references to other objects (or portions thereof) in the cache 110.

If, instead, the digital image 112a-d is located by the object tracking component 118 as already existing in the cache 110, the media player program 106 can create a new reference to the bitmap object 114a-b (e.g., using a new management object 115). For example, when the bitmap object 114a was originally loaded to the cache 110, the bitmap object 114a can include a single reference in the object tracking component 118. Upon a subsequent request to load the same digital image 112a, the bitmap object 114a can include a second reference in the object tracking component 118, each reference relating to the same bitmap object 114a. The subsequent load request, for example, can be issued by a different entity (e.g., media player instance, media player program thread, or other separate process). The different entity can be rendering video content separately from the entity which initially generated the bitmap object 114a. The bitmap object 114a can include information identifying one or more entities which have accessed the bitmap object 114a.

At a later time, the bitmap object 114a can undergo modification. For example, the color of a portion of the pixels of the bitmap object 114a can be changed. The media player program 106 can create a new bitmap object 116 including the modifications made to the bitmap object 114a. Because the new bitmap object 116 is no longer reconstructable using one of the digital images 112a-d in the digital image storage area 108, the new bitmap object 116 is ineligible for regeneration. The new bitmap object 116 can be tracked by the object tracking component 118 as one of the second category 122 of digital image objects.

The second reference to the bitmap object 114a, added due to the subsequent load request associated with the bitmap object 114a, can be removed since the bitmap object 114a has been modified, and thus the second reference is no longer valid. For example, the bitmap object tracking component 118 can remove information associated with the bitmap object 114a identifying the second entity. In another example, when an entity releases the bitmap object, and one or more additional entities are associated with the bitmap object, the reference identifying the entity which released the bitmap object can be removed from the information associated with the bitmap object. Further, when the last entity associated with the bitmap object releases the bitmap object, the bitmap object can be released from the cache memory.

In yet another example, the first loading of the bitmap object 114a can have a first associated management object, and the second loading of the bitmap object 114a can have a second associated management object that points to the first (either to the management object itself or to the bitmap object 114a referenced therein); then, when the bitmap object 114a is changed to form new bitmap object 116, the second associated management object can be updated to reference the new bitmap object 116. Furthermore, the first associated management object can include an indication of how many other cached objects are referencing the cached bitmap associated therewith, and this reference count can be updated as the other cached objects are released.

If, during the load image operation 124, it is discovered that the operation cannot obtain a large enough memory allocation to complete the operation (e.g., the addition of the bitmap object 114a or 114b, or the addition of the new bitmap object 116), the load image operation 124 can generate a release bytes flush event 126 to flush at least enough storage space in the cache 110 to hold the digital image object being added. The release bytes flush event 126 can specify a size of the object being loaded to the cache 110. The media player program 106, for example, can select the N least recently used of the first category 120 of bitmap objects, as tracked by the object tracking component 118, for removal from the cache 110. The load image operation 124 can continue to add the requested bitmap object after the release bytes flush event 126 has completed.

A cache access operation 128 can be received, for example, when bitmap objects are loaded to or accessed within the cache 110. If the media player program 106 is running on a multi-core or multi-processor system enabled for multithreaded rendering, the media player program 106 can run a pre-render pass to lock (e.g., load or regenerate as necessary and mark as ineligible for regeneration) any bitmaps that are likely to be accessed during the multi-threaded rendering pass. If, instead, the media player program 106 is running on a single core system, a cache access can occur as a rendering code request to a pointer to a bitmap object. If that bitmap object is not in the cache, the bitmap object can be regenerated. In response to the cache access operation 128, a periodic flush event 130 can be triggered. Upon receipt of the periodic flush event 130, the media player program 106 can flush any of the first category 120 of bitmap objects 114a-b which have not been accessed during a certain period (e.g., in the last two hundred frames, in the past ten seconds, etc.). The media player program 106, in some implementations, can include a timer, which triggers a periodic flush event on a set schedule. The schedule, for example, can be based upon a period of time (e.g., every tenth of a second) or a number of frames of media content rendered (e.g., every two frames).

In some implementations, one or more system resource management utilities 132 can communicate with the media player program 106 to provide information regarding the availability of resources in the computing device 102. For example, the media player program 106 can periodically query the system resource management utilities 132 to check on the status of resources, or the media player program can provide an alert interface to the system resource management utilities 132 so that the system resource management utilities 132 can warn the media player program 106 of a resource limitation. Based upon information derived from the system resource management utilities 132, a release all flush event 134 can be triggered. Upon receipt of the release all flush event 134, the media player program 106 can flush all of the first category 120 of bitmap objects 114a-b to clear space in the cache 110.

In some implementations, the release bytes flush event 126 or the release all flush event 134 can be called for reasons other than a low memory event. For example, the release all flush event 134 can be triggered when the user pauses the media player program instance rendering the media content.

Figure 2:
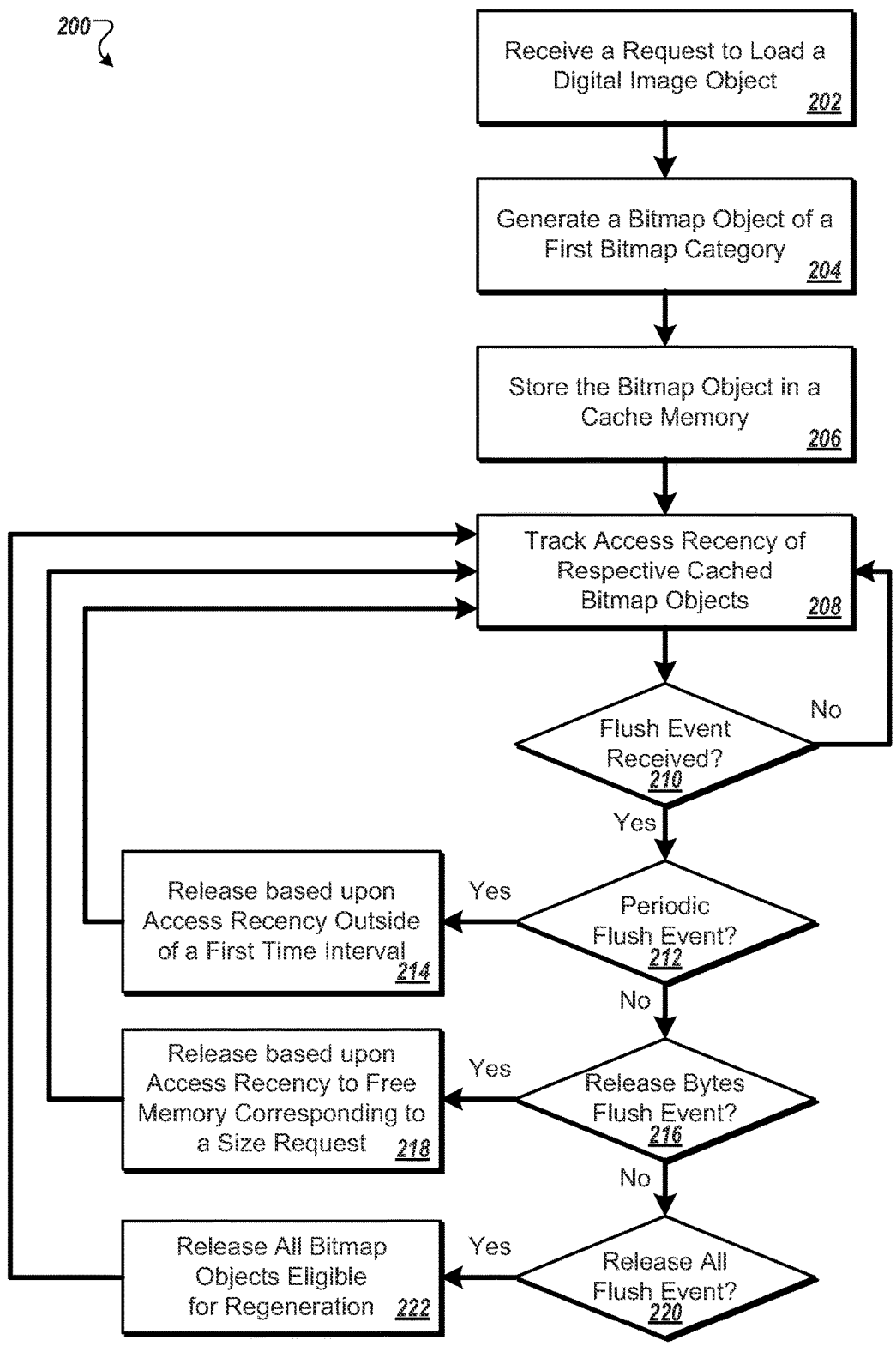
FIGS. 2 and 3 are flow charts of examples of processes used in media player digital image caching.
Figure 3:
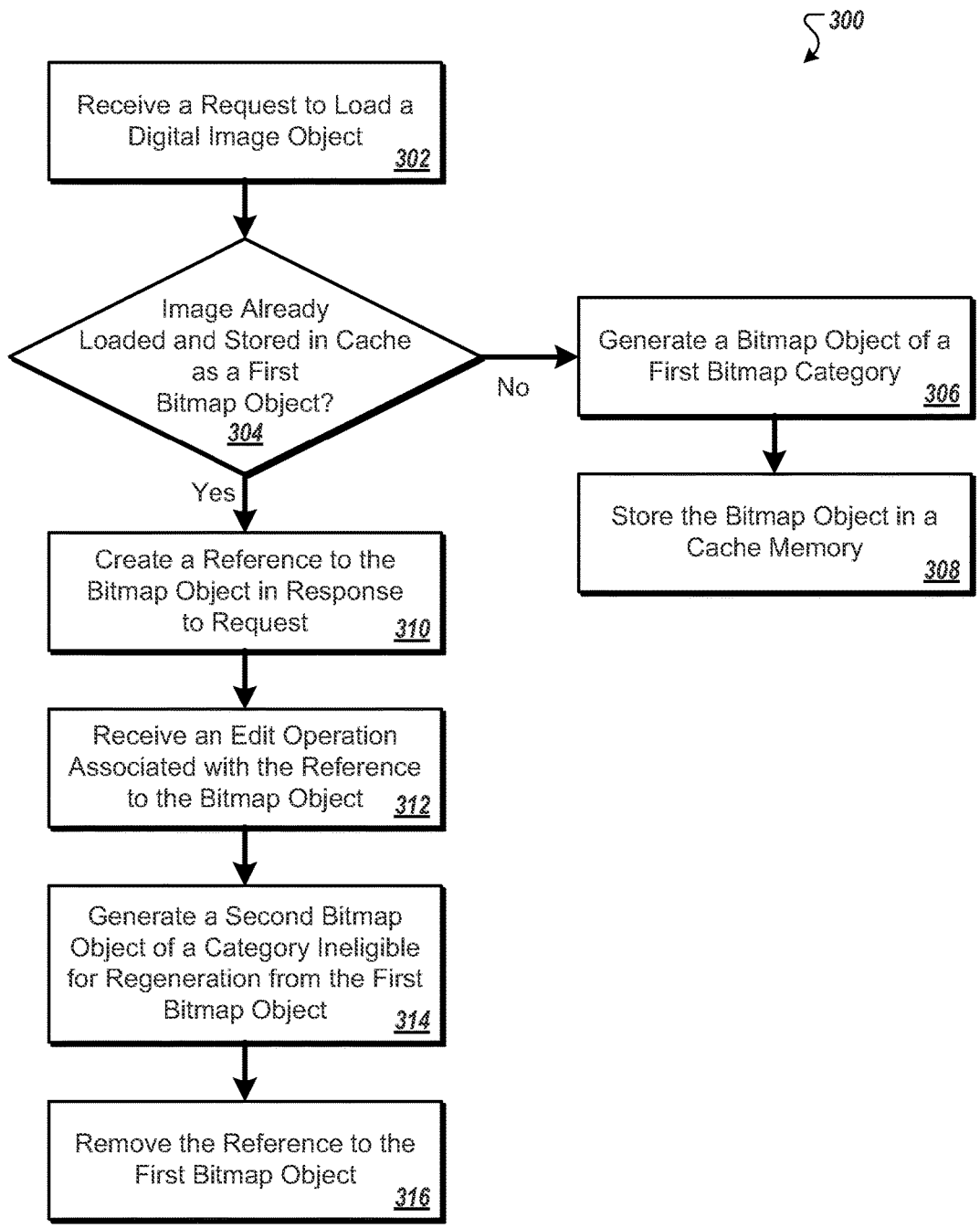

FIGS. 2 and 3 are flow charts of examples of processes used in media player digital image caching. The processes, for example, can be used by the media player program 106 as described in connection with FIG. 1.

As shown in FIG. 2, a first process 200 handles a variety of flush event types received by a media player program. In response to each of the flush event types, one or more bitmap objects eligible for regeneration are purged from a digital image cache.

The process 200 begins with receiving a request to load a digital image object (202). In some implementations, the request for loading the digital image object can occur towards the beginning of processing media content, far in advance of rendering the image to the display device. For example, one or more digital images may be preloaded by a media player program. One or more digital images, in some implementations, may be loaded in an as-needed basis. For example, shortly prior to rendering the image to the display device, the digital image can be loaded as a bitmap object. In some examples, the digital image can be loaded from a storage area, taken as a snapshot from a section of video data, or generated as an image version of text data.

A bitmap object of a first bitmap category is generated (204) from the digital image object. The first bitmap category can include a bitmap type eligible for regeneration, since the source image can be accessed at a later time to reconstruct the bitmap object. The form into which the digital image is generated can depend in part upon the computing device or the display device. For example, the process 200 may generate the bitmap object at a different image depth depending upon the configuration of the computing device. In some implementations, non-transparent digital images can be generated as sixteen bit bitmap objects, while transparent digital images can be generated as thirty-two bit bitmap objects. The color channel composition, in another example, can be varied depending upon the operating system or display format. For example, rather than loading bitmap objects using eight bits per color channel, a 5-6-5 formatted bitmap object can be generated for a 5-6-5 screen format.

Any number of bitmap types categorized as eligible for regeneration is possible. The digital image may be in a compressed format, and generating the bitmap object of a core, or platform independent, bitmap type can include decompressing the image content. In some examples, the compressed digital image can be in a Joint Photographic Experts Group (JPG) format, Graphics Interchange Format (GIF), or a Portable Network Graphics (PNG) format.

If a mipmap is to be generated from the digital image, rather than generating and caching all mipmap levels, in some implementations only the desired image size (e.g., thumbnail) and, optionally, the full size bitmap, can be generated as bitmap objects and stored in the cache memory. For example, if a 1024×1024 compressed digital image is loaded to be displayed as a 64×64 thumbnail image, a four megabyte full size mipmap type bitmap object and a sixteen kilobyte mipmap type bitmap object can be generated from the digital image. If at a later time, an intermediate size mipmap is needed, in some implementations the intermediate mipmap type bitmap object can be generated using the cached full size mipmap type bitmap object.

If the digital image is to be taken from a vector stream, an animation conversion bitmap type can be generated, caching a pre-rendered vector graphics in bitmap format. In some implementations, if a bitmap object does not change from frame to frame, or only changes by translation (movement), the image can be rendered once, then the bitmap version of the rendered content can be cached as an animation conversion bitmap type, for use in subsequent frames.

A script-generated bitmap type can be generated based upon, for example, ACTIONSCRIPT® code, version 2 (AS2) or ACTIONSCRIPT® code, version 3 (AS3) runtime function calls. For example, scripting language can be used to initialize a bitmap of a specified size, draw into the bitmap, and, optionally, make modifications to the runtime-created bitmap object such as pixel adjustments. In some implementations, a filter can be applied to an AS2 or AS3 generated bitmap to create a filtered script-generated bitmap type.

Rather than generating the bitmap from a digital image, in some implementations, a bitmap object can be generated from text data. For example, when translating text data to be rendered to a display as semi-transparent text, a bitmap version of the characters can be created and cached as a text object bitmap type. A rich edit field, in another example, can include a bitmap object version of text data.

The bitmap object is stored in cache memory (206). The cache memory can store bitmap objects eligible for regeneration and bitmap objects ineligible for regeneration as well as, optionally, other digital image objects. When storing the bitmap object, in some examples, the bitmap object type, the bitmap object category, the bitmap object state, the storage location, a reference to the original digital image, and an access recency (e.g., timestamp) can be associated with the bitmap object.

The access recency of respective cached bitmap objects is tracked (208). For example, each time the bitmap object is rendered to the display, or each time a scripting data portion of the media content accesses the bitmap object, the access recency can be updated to reflect the use.

If a flush event is received (210), a flush event type is determined. During a flush event, one or more bitmap objects eligible for regeneration can be purged from the cache memory. The flush, for example, can be used to remove the least recently used bitmap object(s) eligible for regeneration.

If the flush event is a periodic flush event type (212), one or more bitmap objects are released based upon having an access recency outside of a first time interval (214). For example, any bitmap object which has not been accessed since the previous periodic flush event can be released.

If the flush event is a release bytes flush event type (216), one or more cached bitmap objects are released based upon respective access recency to free an area of memory corresponding to a size request (218). For example, when loading a new digital image object (e.g., bitmap object or other data) to the cache memory, the load operation can fail due to there not being enough free space available in the cache memory to hold the size of the new digital image object. The release bytes flush event can be triggered to clear memory space at least as large as the new digital image object.

If, instead, the flush event is a release all flush event type (220), all cached bitmap objects eligible for regeneration are released (222). For example, based upon a resource limitation, such as a memory capacity threshold, a release all flush event can be triggered to free memory space. The resource limitation, in some implementations, is system-dependent. For example, the trigger for the memory flush event can be received from a system resource utility built into the operating system of the computing device. The system resource utility, in some implementations, can be queried periodically to determine whether memory capacity is approaching a threshold value or percentage. Once the flush event has been handled, the process 200 returns to tracking the access recency of respective cached bitmap objects (208).

FIG. 3 is an example of a process 300 for tracking bitmap objects stored in a digital image cache. Separate threads, processes, or media player instances managed by a media player program can load and manipulate a same digital image. Rather than generating and caching a separate bitmap object each time a digital image is loaded by a separate entity, the process 300 describes a method for sharing a reference to a single bitmap object within cache memory.

The process 300 begins with receiving a request to load a digital image object (302). In some examples, the digital image can be loaded from a storage area, taken as a snapshot from a section of video data, or generated as an image version of text data.

If the image has not already been loaded and stored in the digital image cache as a first bitmap object (304), a bitmap object of a first bitmap category is generated (306). For example, a bitmap object of a bitmap type or a bitmap state eligible for regeneration, such as a core bitmap type, a mipmap type, a script-generated bitmap type, a text object bitmap type, or an animation conversion bitmap type, can be generated. In some implementations, if the bitmap object is a mipmap type, and another size of the mipmap was previously cached as a bitmap object, the mipmap type bitmap object can be generated directly from the previously cached bitmap object. For example, if a 1:2 size mipmap type bitmap object was previously cached, a new 1:4 size mipmap type bitmap object can be generated based upon the 1:2 size mipmap type bitmap object.

The bitmap object is stored in a cache memory (308). The bitmap object can be stored in a cache memory which is monitored by a flush event process such as the process 300 described in relation to FIG. 3. For example, an object tracking component, such as the object tracking component 118 of FIG. 1, can track the access recency of the cached bitmap object.

If, instead, it is determined that the image has been stored in the cache (304), a reference to the bitmap object is created in response to the request (310). The reference can be tracked, in some implementations, along with the access recency. For example, the tracking method can store the reference created by the second entity and can update the access recency based upon access by either the entity which originally generated the bitmap object or by the second entity referencing the bitmap object.

At a later time, an edit operation associated with the reference to the bitmap object is received (312). The edit operation can attempt to modify the bitmap object. In modifying, the bitmap object will no longer match the digital image from which the bitmap object was generated.

A second bitmap object of a category ineligible for regeneration is generated from the first bitmap object (314). The second bitmap object can be a unique bitmap object, incapable of being automatically reconstructed from a base image. If, instead, the first bitmap object were modified in a controlled manner, such as by applying a filter to the first bitmap object, in some implementations the second bitmap object could be generated as a different type of bitmap object (e.g., a filtered bitmap object) also eligible for regeneration. For example, the bitmap object tracking component could track the operation applied to the bitmap object to generate the second bitmap object. In some implementations, the second bitmap object and the first bitmap object have the same bitmap type, however, the bitmap state of the second bitmap object is set to one of ineligible for regeneration. For example, a state flag associated with the second bitmap object can be set to a value of ineligible for regeneration.

The reference to the first bitmap object is removed (316). For example, the first bitmap object, while remaining in the cache, is associated with the first entity but not with the second entity. Instead, the second entity can have an association with the second bitmap object. The first bitmap object, for example, can include information identifying one or more entities which have accessed the first bitmap object. The listed entities can include entities which are still active (e.g., processing) and have not already actively released the first bitmap object. In removing the reference, information identifying the second entity can be removed from the first bitmap object.

In some implementations, the reference is removed only if the second entity expressly releases the first bitmap object. Otherwise, rather than removing the reference, both the first bitmap object and the second bitmap object can include information identifying the second entity. Although the second entity has modified the first bitmap object, the second entity can continue to access the first bitmap object, in some examples either making different modifications to the first bitmap object or rendering the first bitmap object to the display.

Figure 4:
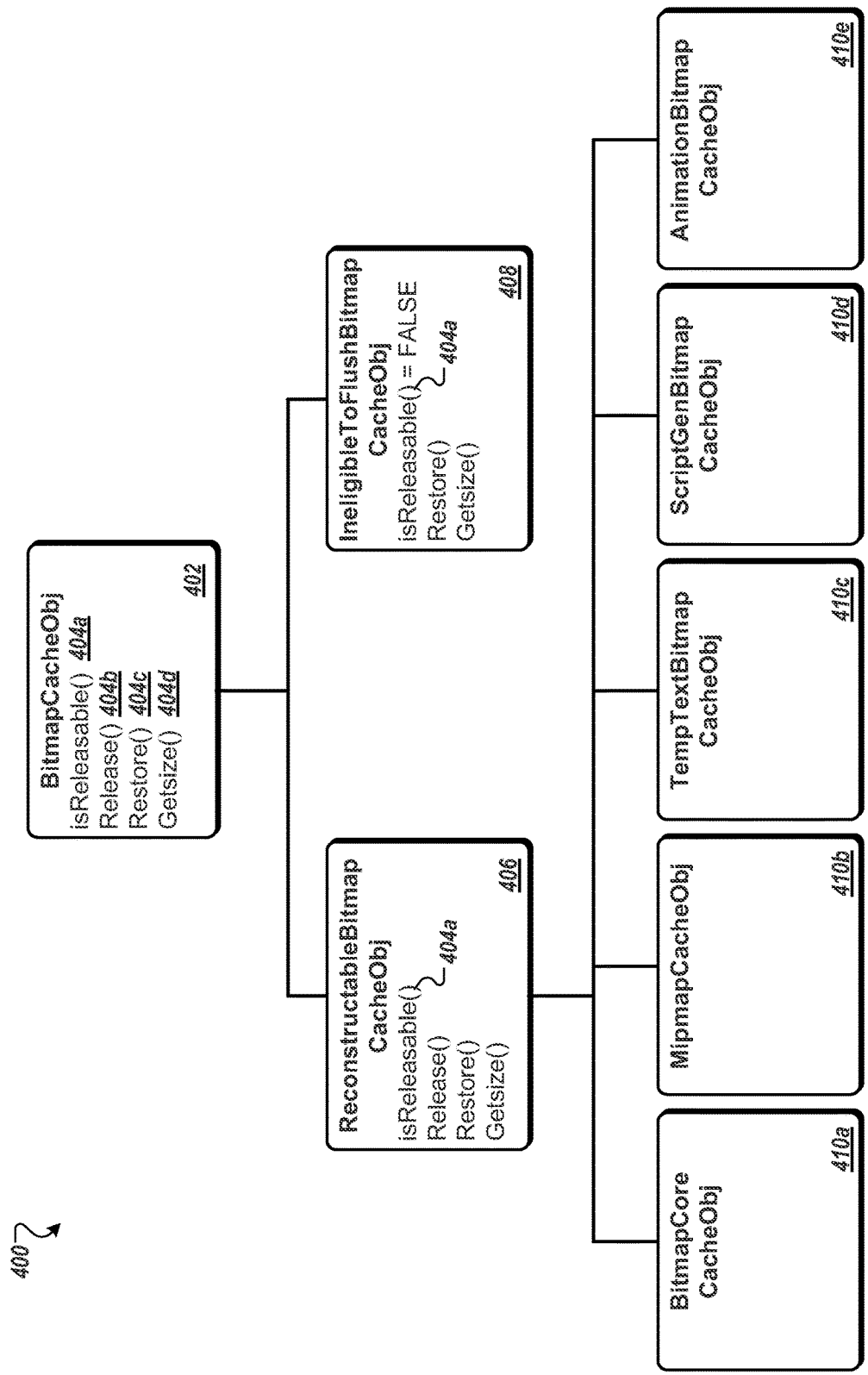
FIG. 4 is a block diagram of an object-oriented design class framework for managing media player digital image caching.

FIG. 4 is a block diagram of an image class storage hierarchy 400 for managing media player digital image caching. Each of the items contained in the bitmap cache can be abstracted from a basic definition, or bitmap class data structure, such as a BitmapCacheObject 402. In some examples, objects stored in the cache can include bitmap objects, graphic vectors, or even compound objects such as surfaces. Surfaces can contain two or more bitmaps for filters and other manipulations. Each bitmap within a surface can be cached individually, as individual bitmap object types, while also being grouped as elements of a surface object type included in a surface type bitmap class data structure. The BitmapCacheObject 402 can be used to implement a management object, and the hierarchy 400 can be used to denote when a regeneratable image has been accessed.

The various types of bitmap objects can share one or more virtual methods that can be overridden by each subclass of the basic bitmap class data structure (e.g., bitmap type). Upon such overriding, the resulting management object (e.g., object 406) provides an interface through which the subclass operations can be effected to release and restore (if possible for that subclass) the bitmap object data. For example, the BitmapCacheObject 402 includes the virtual methods isReleasable( ) 404a, Release( ) 404b, Restore( ) 404c, and GetSize( ) 404d. The virtual method isReleasable( ) 404a, for example, can be toggled to signify whether a particular type of cache object is eligible for regeneration or not. For example, in a general sense, a ReconstructableBitmapCacheObject 406 can have the virtual method isReleasable( ) 404a set to TRUE, while an IneligibleToFlushBitmapCacheObject 408 can have the virtual method isReleasable( ) 404a set to FALSE. Note that in practice, the isReleasable( ) 404a of the ReconstructableBitmapCacheObject 406 may not be permanently set to TRUE since this can be a dynamic method that depends on the current state of each object, and the IneligibleToFlushBitmapCacheObject 408 may have no Release( ) method at all on the ineligible to flush side.

In some implementations, the virtual method isReleasable( ) or, alternatively, another virtual method or flag (e.g., referring to a bitmap state) can be set individually, per bitmap object, depending upon the state of the bitmap object. For example, one or more bitmap objects can be flagged as ineligible for regeneration prior to a rendering pass, based upon likely access within a rendering pass. A bitmap type, which by default is eligible for regeneration, can be marked temporarily ineligible for regeneration in this manner. In some implementations, following the rendering pass, the bitmap state of the temporarily marked bitmap objects can be reverted to being eligible for regeneration.

The virtual method Release( ) 404b can be called to remove a bitmap object from the bitmap cache. If a particular bitmap subclass data structure supports referencing a single bitmap object by two or more entities, as described in the process 300 described in relation to FIG. 3, the virtual method Release( ) 404b can include code to enable releasing a reference to an existing bitmap object.

The virtual method Restore( ) 404c can be used to reconstruct a previously released bitmap object eligible for regeneration. In some implementations, the virtual method Restore( ) 404c can be used to generate a bitmap object to store in the cache memory if the loading of the bitmap object was previously delayed (e.g., due to a processing limitation).

The virtual method GetSize( ) 404d can be used to determine the storage space used by the bitmap object. In some implementations, when a release bytes flush event 126 is received, the media player program can call the virtual method GetSize( ) 404d for each of the least recently used bitmap objects eligible for regeneration until the storage space needed for loading the new digital image has been located.

In some examples, the reconstructable bitmap class data structures (e.g., subclasses of the bitmap class data structure ReconstructableBitmapCacheObject 406) can include a BitmapCoreCacheObject 410a storing bitmap data pertaining to a core bitmap type, a MipmapCacheObject 410b storing bitmap data pertaining to a mipmap type, a TempTextBitmapCacheObject 410c storing bitmap data pertaining to a text object bitmap type, a ScriptGenBitmapCacheObject 410d storing bitmap data pertaining to a script-generated bitmap type, or an AnimationBitmapCacheObject 410e storing bitmap data pertaining to an animation conversion bitmap type.

It should be noted that the management objects can be completely distinct from the bitmap objects themselves. Objects are cached that expose a given interface, but in practice, separate cache objects can be created that are attached to the actual bitmap objects in some way, generally as an instance variable inside the object. Moreover, while the image class storage hierarchy 400 is described as a hierarchy, in other implementations, the various bitmap objects can be configured as an abstract or a polymorphic interface, where individual bitmap object types contain differing function code for the same function call. In this manner, different types of bitmap objects can be purged and reconstructed without having to know the underlying details pertaining to each individual bitmap object type.

Figure 5:
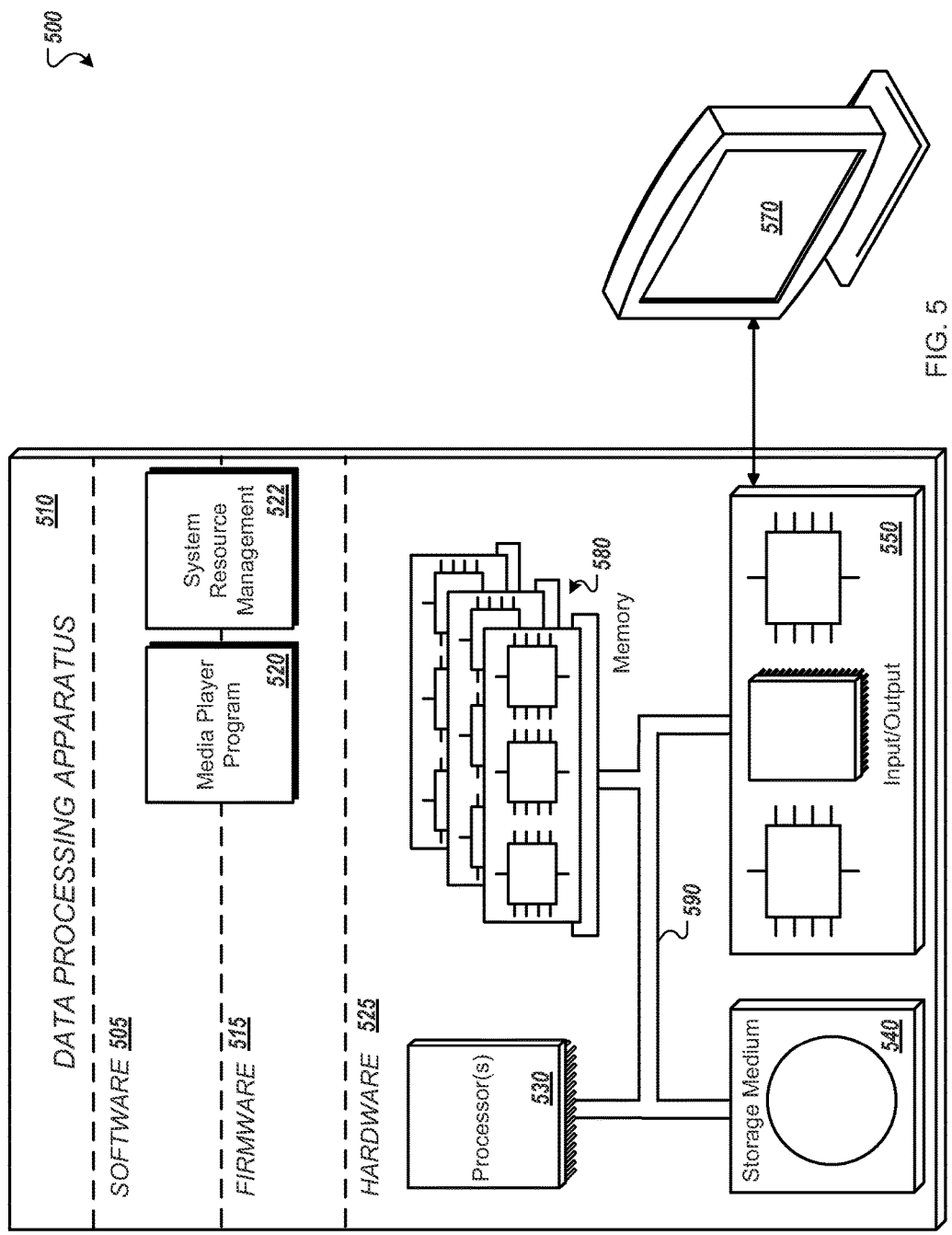
FIG. 5 is a block diagram of an example of an apparatus for managing digital images cached by a media player program.

FIG. 5 is a block diagram of an example of an apparatus 500 for managing digital images cached by a media player program 520. A data processing apparatus 510 can include hardware 525, firmware 515 and software 505, and can include the media player program 520 and one or more system resource management program(s) 522 operating in conjunction with the data processing apparatus 510 to effect various operations described in this specification. The media player program 520 and system resource management program(s) 522, in combination with the various hardware 525, firmware 515, and software 505 components of the data processing apparatus 510, represent one or more structural components in the apparatus 500, in which the algorithms described herein can be embodied.

The media player program 520 can be one or more applications for inputting, processing, and/or outputting media content (e.g., audio, video, graphical, and/or textual data). The media player program 520 can input media information from the other applications installed in the data processing apparatus 510, one or more storage mediums accessible to the data processing apparatus 510, or remotely through a network. The media player program 520 can output media information to one or more output devices such as a display device 570 and, optionally, one or more speakers. An application refers to a computer program that the user perceives as a distinct computer tool used for a defined purpose. An application can be built entirely into an operating system or other operating environment, or it can have different components in different locations (e.g., a remote server). The media player program 520 can include or interface with other software. The media player program 520 can include a stand alone media player program, a media player program that relies on a runtime environment to operate (e.g., a JAVA® virtual machine or an Adobe AIR® runtime environment), or multiple different media player programs, which can be stand alone, browser-based, or runtime environment-based, in some examples.

Interface software can also be included that operates over a network to interface with other processors, such as in a media server communicating with the data processing apparatus 510 to provide streaming media content.

The hardware level 525 of the data processing apparatus 510 includes one or more processors 530, a memory 580, and at least one computer-readable medium 540 (e.g., random access memory, storage device, etc.). The hardware level 525 can also include one or more input/output devices 550, including one or more user interface devices.

Each of the components 530, 540, 550, and 580 are interconnected using a system bus 590. The processor(s) 530 can process instructions for execution within the apparatus 500. In some implementations, one or more single-threaded processors can be included within the processor(s) 530. In other implementations, one or more multi-threaded processors can be included within the processor(s) 530. In some implementations, the processor(s) 530 can process instructions stored in the memory 580, or on the computer-readable medium 540, to display graphical information on a display device.

The memory 580 can be a computer-readable medium used to store information within the apparatus 500 and can include a volatile memory unit, a non-volatile memory unit, or both. The storage device 540 can provide mass storage for the apparatus 500. The storage device 540 can include a floppy disk device, a hard disk device, an optical disk device, or a tape device.

The input/output devices 550 provide input/output operations for the apparatus 500. The input/output devices 550 can include a keyboard, mouse, stylus or pointing device, a display unit for displaying graphical user interfaces such as a display device, a modem or other networking hardware/firmware, or any combination thereof to name a few examples.

The subject matter described in this specification can also be used in conjunction with other input/output devices, such as a printer or scanner. An input/output device can be used to connect to a network and can furthermore connect to one or more processors via the network (e.g., the Internet).

Therefore, a user of the media player program 520 or system resource management program(s) 522 does not need to be local, and may be connecting in a wired or wireless fashion using an internet or intranet connection on a personal computer, personal digital assistant (PDA), smart-phone (e.g., a cellular phone including an operating system and advanced computing capabilities), or using other suitable hardware and software at a remote location. For example, a user can access a web interface via the remote processor in order to engage in a video viewing session. In any event, data can be transmitted over a network to and from the data processing apparatus 510. Note that the data processing apparatus 510 can itself be considered a user interface device (e.g., when the media player program 520 is delivered by a remote server as a web service).

The apparatus 500 can be used for caching and managing bitmap objects by the media player program 520. The media player program 520 can track bitmap objects generated from digital images loaded by individual instances rendering media content to a visible portion of the display device 570. To preserve resources, such as memory space in the memory 580 or the storage medium 540, the media player program 520 can purge bitmap objects eligible for regeneration from a bitmap object cache managed by the media player program 520. In some examples, the media player program 520 can purge bitmap objects based upon a periodic flush event or a release bytes flush event.

In some implementations, the media player program 520 receives an indication from the system resource management program(s) 522 that resources are near capacity. For example, the media player program 520 can query system firmware to determine digital image cache memory space available in the memory 580. Based upon resource capacity, the media player program 520 can trigger a release all flush event to determine a number or total storage allocation of bitmap objects, eligible for regeneration, to purge from the cache.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component; subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a request to load a digital image object for rendering to a display device;
generating a first object from the digital image object; and
managing memory operations of the first object in a cache memory using a management object generated separately when the first object is generated that references only to the first object, the management object added to the cache memory before the first object is added to the cache memory, and removed from the cache memory together with the first object.

2. The method of claim 1, where the first object is a first bitmap object of a first bitmap category, and the managing comprises:
storing the first bitmap object in a memory allocation of the cache memory, the cache memory including bitmap objects of two or more bitmap categories, where
at least one of the bitmap categories, including the first bitmap category, is eligible for regeneration, and
at least one of the bitmap categories, including a second bitmap category, is ineligible for regeneration;
tracking access recency of bitmap objects in the cache memory associated with the at least one of the bitmap categories eligible for regeneration;
receiving a flush event for the cache memory; and
releasing one or more of the bitmap objects from the cache memory based on the access recency of the bitmap objects and the bitmap category being one eligible for regeneration.

3. The method of claim 2, where the digital image object is a compressed digital image object, the first bitmap category is a platform independent bitmap type, and the generating includes decompressing the digital image object, the method comprising:
receiving a request to access one of the released one or more bitmap objects; and
reconstructing the requested bitmap object, where the reconstructing includes generating a second bitmap object of the first bitmap category from the digital image object.

4. The method of claim 2, further comprising:
receiving a second request to load the digital image object for rendering to the display device;
creating a reference to the first bitmap object in response to the second request, wherein the first bitmap object is one of a first bitmap type, and a bitmap state of the first bitmap object is set to eligible for regeneration;
receiving an edit operation for the first bitmap object, the edit operation associated with the second request;
generating a second bitmap object of a second category from the first bitmap object, wherein the second bitmap object is of the first bitmap type, and a bitmap state of the second bitmap object is set to ineligible for regeneration; and
removing the reference to the first bitmap object.

5. The method of claim 2, wherein:
the flush event includes a flush event type;
said receiving the flush event includes receiving a periodic flush event type corresponding to a time period; and
said releasing responsive to the periodic flush event type includes determining whether the first bitmap object has been accessed within a first time interval by referencing the access recency of the first bitmap object, and said releasing based upon the determining.

6. The method of claim 5, wherein:
said receiving the flush event further includes receiving a release bytes flush event type corresponding to a failure to load an object into the memory cache, the flush event further including a size request;
said releasing responsive to the release bytes flush event type includes releasing one or more least recently accessed bitmap objects eligible for regeneration, based upon the access recency, to free a total cache memory allocation corresponding to the size request;
said receiving the flush event further includes receiving a release all flush event type corresponding to a memory capacity threshold; and
said releasing responsive to the release all flush event type includes releasing all of the bitmap objects eligible for regeneration.

7. The method of claim 1, where the managing comprises managing using a bitmap class data structure built upon a class structure hierarchy, the method comprising:
creating a new bitmap type eligible for regeneration, where the creating includes adding a new bitmap class data structure to the class structure hierarchy.

8. A computer storage memory encoded with a computer program, the program comprising instructions that when executed by data processing apparatus cause the data processing apparatus to perform operations comprising:
receiving a request to load a digital image object for rendering to a display device;
generating a first object from the digital image object; and
managing memory operations of the first object in a cache memory using a management object generated separately when the first object is generated that references only to the first object, the management object added to the cache memory before the first object is added to the cache memory, and removed from the cache memory together with the first object.

9. The computer storage memory of claim 8, where the first object is a first bitmap object of a first bitmap category, and the managing comprises:
storing the first bitmap object in a memory allocation of the cache memory, the cache memory including bitmap objects of two or more bitmap categories, where
at least one of the bitmap categories, including the first bitmap category, is eligible for regeneration, and
at least one of the bitmap categories, including a second bitmap category, is ineligible for regeneration;
tracking access recency of bitmap objects in the cache memory associated with the at least one of the bitmap categories eligible for regeneration;
receiving a flush event for the cache memory; and
releasing one or more of the tracked bitmap objects from the cache memory based on the access recency of the bitmap objects and the bitmap category being eligible for regeneration.

10. The computer storage memory of claim 9, wherein:
the digital image object is a compressed digital image object, the first bitmap category is a platform independent bitmap type, and the generating includes decompressing the digital image object;
the operations further comprising:
receiving a request to access one of the released one or more bitmap objects; and
reconstructing the requested bitmap object, where the reconstructing includes generating a second bitmap object of the first bitmap category from the digital image object.

11. The computer storage memory of claim 9, where the operations further comprise:
receiving a second request to load the digital image object for rendering to the display device;
creating a reference to the first bitmap object in response to the second request, wherein the first bitmap object is one of a first bitmap type, and a bitmap state of the first bitmap object is set to eligible for regeneration;
receiving an edit operation for the first bitmap object, the edit operation associated with the second request;
generating a second bitmap object of a second category from the first bitmap object, wherein the second bitmap object is one of the first bitmap type, and a bitmap state of the second bitmap object is set to one of ineligible for regeneration; and
removing the reference to the first bitmap object.

12. The computer storage memory of claim 9, wherein:
the flush event includes a flush event type;
said receiving the flush event includes receiving a periodic flush event type corresponding to a time period; and
said releasing responsive to the periodic flush event type includes determining whether the first bitmap object has been accessed within a first time interval by referencing the access recency of the first bitmap object, and said releasing based upon the determining.

13. The computer storage memory of claim 12, wherein:
said receiving the flush event further includes receiving a release bytes flush event type corresponding to a failure to load an object into the memory cache, the flush event further including a size request;
said releasing responsive to the release bytes flush event type includes releasing one or more least recently accessed bitmap objects eligible for regeneration, based upon the access recency, to free a total cache memory allocation corresponding to the size request;
said receiving the flush event further includes receiving a release all flush event type corresponding to a memory capacity threshold; and
said releasing responsive to the release all flush event type includes releasing all of the bitmap objects eligible for regeneration.

14. The computer storage memory of claim 8, where the managing comprises managing using a bitmap class data structure built upon a class structure hierarchy, the method comprising:
creating a new bitmap type eligible for regeneration, where the creating includes adding a new bitmap class data structure to the class structure hierarchy.

15. A system comprising:
a display device;
a computer storage memory containing a cache memory; and
one or more processors operable to interact with the computer storage memory and programmed to manage caching of data objects to be rendered to the display device using management objects generated separately when the data objects are generated that are cached along with the data objects in the cache memory, where at least one of the management objects includes a reference to a single corresponding data object and an interface through which release and restoration of the corresponding data object is effected, and wherein the at least one of the management objects is cached in the cache memory before the corresponding data object is cached in the cache memory, and removed from the cache memory together with the corresponding data object.

16. The system of claim 15, where the data objects comprise bitmap objects, the one or more processors being programmed to track access recency of one or more bitmap objects that are eligible for regeneration, being distinct from one or more bitmap objects that are ineligible for regeneration, and to release one or more of the one or more bitmap objects that are eligible for regeneration based on the access recency.

17. The system of claim 16, where the released one or more of the one or more bitmap objects that are eligible for regeneration comprise a decompressed version of a digital image, and the restoration of the corresponding data object comprises decompressing the digital image.

18. The system of claim 16, the one or more processors being programmed to release data objects periodically based on the access recency compared to a first time interval.

19. The system of claim 15, the one or more processors being programmed to cache a second management object that includes a reference to the corresponding data object of the at least one of the management objects, and to generate a new data object from the corresponding data object and update the second management object to reference the new data object responsive to a request to edit object data corresponding to the second management object.

20. The system of claim 15, where the management objects are derived from a class data structure built upon a class structure hierarchy.

* * * * *